(12) United States Patent
Kaihara

(10) Patent No.: US 6,226,458 B1
(45) Date of Patent: May 1, 2001

(54) CAMERA

(75) Inventor: Shoji Kaihara, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/426,024

(22) Filed: Oct. 25, 1999

(30) Foreign Application Priority Data

Oct. 30, 1998 (JP) .................................................. 10-310696

(51) Int. Cl.⁷ .................................................. G03B 17/00
(52) U.S. Cl. ............................................................ 396/50
(58) Field of Search ............................................... 396/50

(56) References Cited

U.S. PATENT DOCUMENTS 5,659,805 * 8/1997 Furlani et al. ............................ 396/50

* cited by examiner

Primary Examiner—W. B. Perkey
(74) Attorney, Agent, or Firm—Robin, Blecker & Daley

(57) ABSTRACT

A camera includes a movable mirror which moves between a mirror-down position and a mirror-up position, an attitude detecting device which detects an attitude of the camera, and a control circuit in which a plurality of periods of stabilization time of the movable mirror are set and which changes over the stabilization time of the movable mirror among the plurality of periods according to a result of detection provided by the attitude detecting device. If the attitude of the camera has changed in process of a continuous photo-taking operation, the control circuit keeps the stabilization time of the movable mirror set at the time of start of the continuous photo-taking operation without changing over the stabilization time of the movable mirror.

18 Claims, 11 Drawing Sheets

FIG. 2A
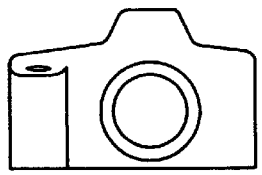
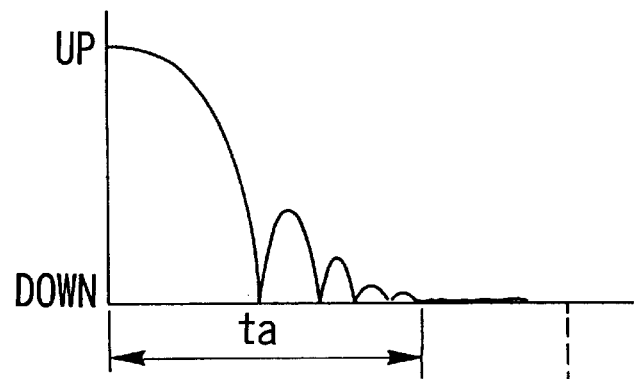
FIG. 2B
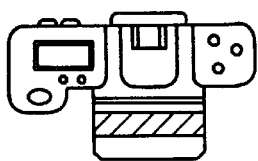
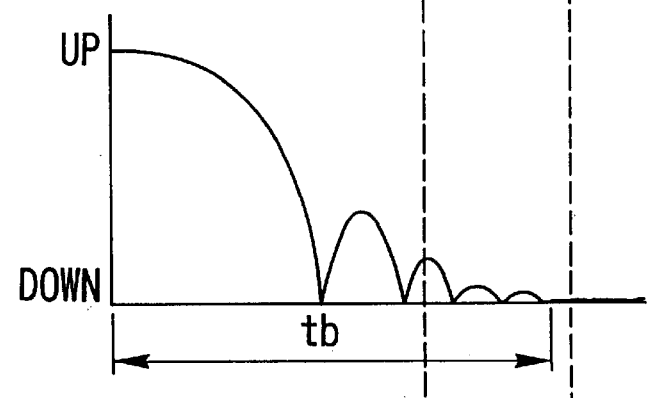
FIG. 2C
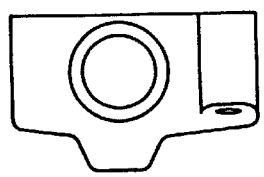
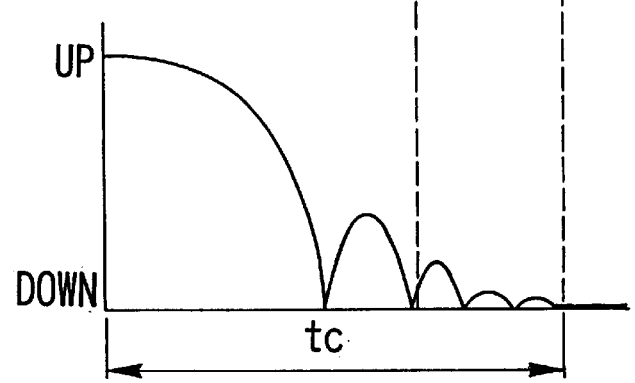

FIG. 7A

| | STATES OF SWITCHES | | | |
|---|---|---|---|---|
| | S1 | S2 | S3 | S4 |
| NORMAL | 0 | 0 | 1 | 0 |
| | 0 | 0 | 1 | 1 |
| INVERTED | 0 | 0 | 0 | 0 |
| | 0 | 0 | 0 | 1 |
| M-UP | 0 | 0 | 0 | 0 |
| | 1 | 0 | 0 | 0 |
| | 0 | 1 | 0 | 0 |
| | 1 | 1 | 0 | 0 |
| M-DOWN | 0 | 0 | 0 | 1 |
| | 1 | 0 | 0 | 1 |
| | 0 | 1 | 0 | 1 |
| | 1 | 1 | 0 | 1 |
| G-UP | 0 | 1 | 0 | 0 |
| | 0 | 1 | 1 | 0 |
| G-DOWN | 1 | 0 | 0 | 0 |
| | 1 | 0 | 1 | 0 |

FIG. 7B

| | STATES OF SWITCHES | | | | ATTITUDE OF CAMERA |
|---|---|---|---|---|---|
| | S1 | S2 | S3 | S4 | |
| 0 | 0 | 0 | 0 | 0 | INVERTED OR M-UP |
| 1 | 1 | 0 | 0 | 0 | G-DOWN OR M-UP |
| 2 | 0 | 1 | 0 | 0 | G-UP OR M-UP |
| 3 | 1 | 1 | 0 | 0 | M-UP |
| 4 | 0 | 0 | 1 | 0 | NORMAL |
| 5 | 1 | 0 | 1 | 0 | G-DOWN |
| 6 | 0 | 1 | 1 | 0 | G-UP |
| 7 | 1 | 1 | 1 | 0 | ABNORMAL |
| 8 | 0 | 0 | 0 | 1 | M-DOWN OR INVERTED |
| 9 | 1 | 0 | 0 | 1 | M-DOWN |
| 10 | 0 | 1 | 0 | 1 | M-DOWN |
| 11 | 1 | 1 | 0 | 1 | M-DOWN |
| 12 | 0 | 0 | 1 | 1 | NORMAL |
| 13 | 1 | 0 | 1 | 1 | BETWEEN NORMAL, G-DOWN AND M-DOWN |
| 14 | 0 | 1 | 1 | 1 | BETWEEN NORMAL, G-UP AND M-DOWN |
| 15 | 1 | 1 | 1 | 1 | ABNORMAL |

NORMAL: NORMAL ATTITUDE
INVERTED: INVERTED ATTITUDE
M-UP: LENS-UP ATTITUDE
M-DOWN: LENS-DOWN ATTITUDE
G-UP: GRIP-UP ATTITUDE
G-DOWN: GRIP-DOWN ATTITUDE

S1: FIRST ATTITUDE DETECTING SWITCH
S2: SECOND ATTITUDE DETECTING SWITCH
S3: THIRD ATTITUDE DETECTING SWITCH
S4: FOURTH ATTITUDE DETECTING SWITCH

CAMERA

BACKGROUND OF THE INVENTION

1. Field of the Invention

The present invention relates to a camera having an attitude detecting function and arranged to perform control according to the attitude of the camera.

2. Description of Related Art

FIG. 11 shows a single-lens reflex camera. The single-lens reflex camera is provided with a main mirror 104 for guiding an object image, i.e., information on an object to be photographed, from a photo-taking lens 103 to an eyepiece 107 and a light measuring sensor 108 through a viewfinder optical system 106. The main mirror 104 is swingably disposed between the photo-taking lens 103 and a shutter 110 which is arranged to control an exposure amount in exposing a film 111 to the object image coming from the photo-taking lens 103. When the camera measures light while the camera user is observing the object before taking a shot, the main mirror 104 is set at an observing position, i.e., at an entrance position within a photo-taking optical path where the object image from the photo-taking lens 103 can be guided to the eyepiece 107.

A central part of the main mirror 104 is arranged to be a half mirror. A submirror 105 is swingably carried by the main mirror 104. A part of the object information from the photo-taking lens 103 passes through the half mirror part of the main mirror 104 to be guided to a focus detecting device 112 through the submirror 105.

To prevent the object image from the photo-taking lens 103 from being eclipsed by the main mirror 104 and the submirror 105 in taking a shot, the mirrors 104 and 105 are swung upward into a retracted position which is located outside of the photo-taking optical path.

After completion of an exposure, the main mirror 104 and the submirror 105 are moved back to the observing position to permit observation of the object and light-measuring and focus-detecting actions for the next shot.

The main mirror 104 is urged to move downward by a spring (not shown). When a member which is pushing the main mirror 104 upward is released from the pushing action after completion of an exposure, the main mirror 104 is caused by the urging force of the spring to swing downward back to the observing position. Following the downward motion of the main mirror 104, the submirror 105 also moves back to the position shown in FIG. 11.

According to the procedures for the sequence of actions of the camera to be performed after an exposure, the light-measuring and focus-detecting actions, etc., for the next shot are allowed to be performed after the lapse of a predetermined period of time (mirror stabilization time) from the commencement of downward movement of the mirrors 104 and 105 from the retracted position to the observing position. The predetermined period of mirror stabilization time is set at a length of time found through tests to be required after the commencement of the downward movement of the mirrors from the retracted position to the observing position and before they cease to bounce on stoppers to lay at rest.

However, since each of the mirrors has a certain amount of mass, the length of time to be set as the mirror stabilization time varies with the posture or attitude of the camera. In other words, the mirror stabilization time varies according to the relation of the urging direction of a spring force to the direction of gravity. In view of this, a camera disclosed, for example, in Japanese Laid-Open Patent Application No. HEI 6-74766 is arranged to have the mirror stabilization time selectable from among a plurality of periods set according to the various attitudes of the camera.

BRIEF SUMMARY OF THE INVENTION

In accordance with one aspect of the invention, there is provided a camera comprising a movable mirror which moves between a mirror-down position and a mirror-up position, an attitude detecting device which detects an attitude of the camera, and a control circuit in which a plurality of periods of stabilization time of the movable mirror are set and which changes over the stabilization time of the movable mirror among the plurality of periods according to a result of detection provided by the attitude detecting device, wherein, if the attitude of the camera has changed in process of a continuous photo-taking operation, the control circuit keeps the stabilization time of the movable mirror set at the time of start of the continuous photo-taking operation without changing over the stabilization time of the movable mirror, so that it is possible to continue the photo-taking operation at a fixed interval during process of the continuous photo-taking operation.

The above and other aspects and features of the invention will become apparent from the following detailed description of a preferred embodiment thereof taken in connection with the accompanying drawings.

BRIEF DESCRIPTION OF THE SEVERAL VIEWS OF THE DRAWING

FIGS. 2A, 2B and 2C are diagrams for explaining the movement of the mirror in the camera at different attitudes.

FIGS. 7A and 7B are tables showing the relationships between the outputs of the attitude detecting switches and the various attitudes of the camera.

DETAILED DESCRIPTION OF THE INVENTION

Hereinafter, a preferred embodiment of the invention will be described in detail with reference to the drawings.

Figure 1A:
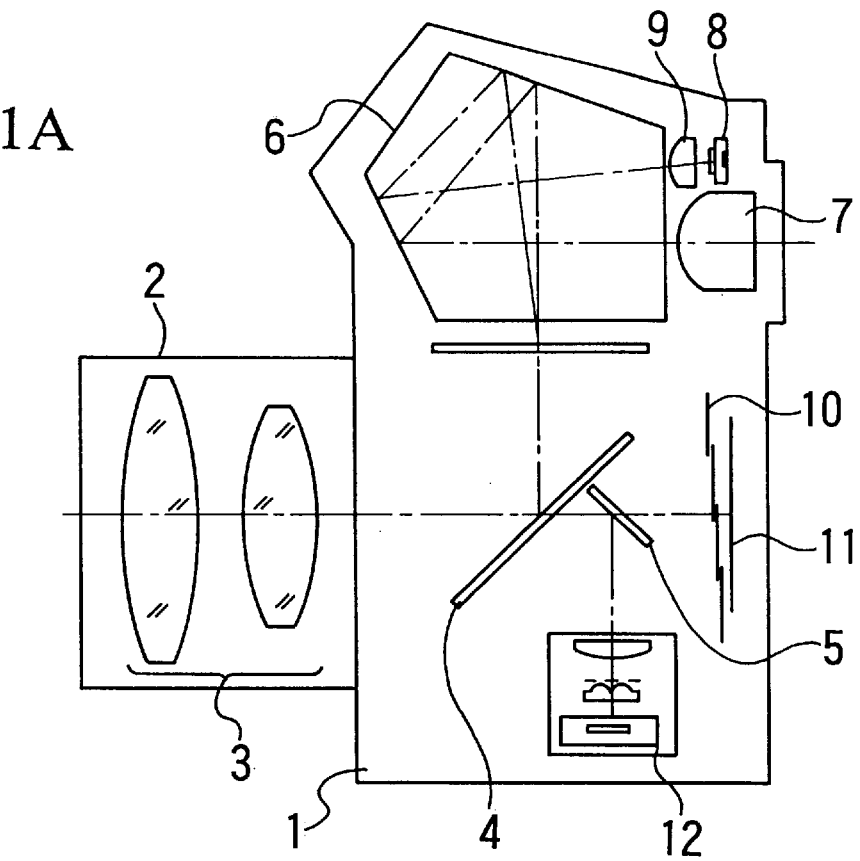
FIGS. 1A and 1B are sectional views showing the essential parts of a camera according to an embodiment of the invention.
Figure 1B:
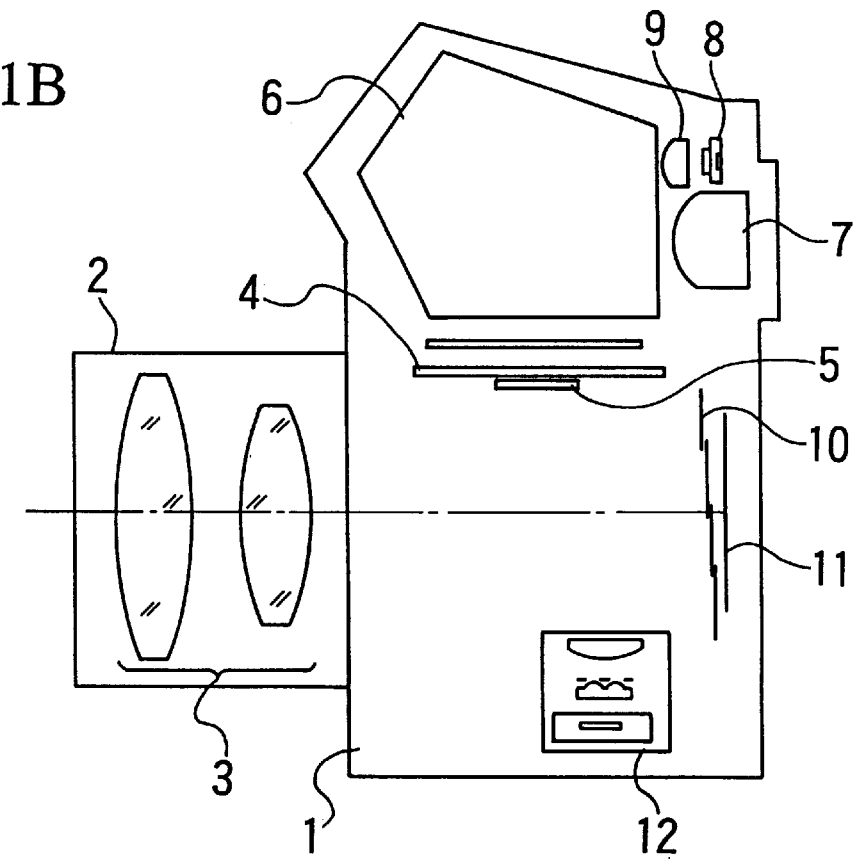
Figure 5A:
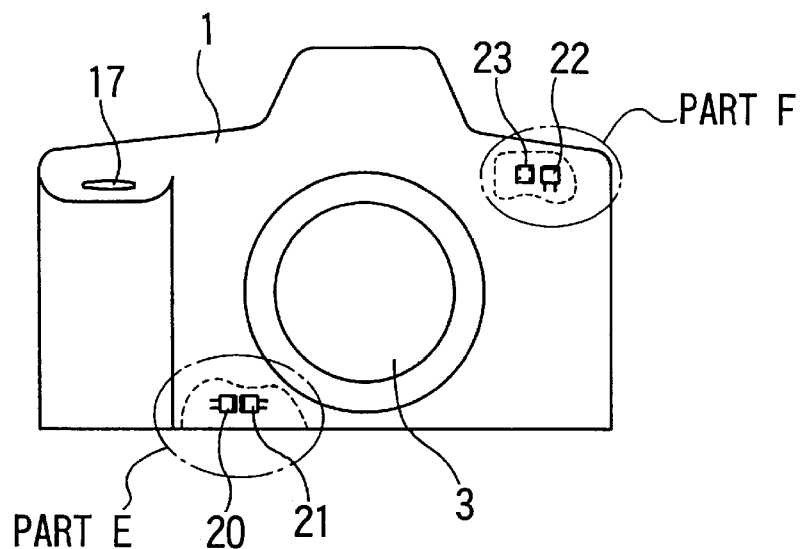
FIGS. 5A, 5B and 5C are diagrams showing the allocations of the attitude detecting switches.

FIGS. 1A and 1B and FIG. 5A show a single-lens reflex camera according to the embodiment of the invention. FIGS. 1A and 1B are sectional views of the camera, while FIG. 5A is a front view of the camera.

FIGS. 2A, 2B and 2C are diagrams for explaining the mirror-down action of the camera.

Referring to FIGS. 1A and 1B, reference numeral 1 denotes a camera body and reference numeral 2 denotes a lens barrel 2 holding a photo-taking lens 3. A main mirror 4 is mounted on the camera body 1 in such a way as to be vertically swingable. A submirror 5 is swingably mounted on the main mirror 4. A pentagonal roof prism 6 is arranged to constitute a viewfinder optical system. Reference numeral 7 denotes an eyepiece. A light measuring lens 9 is arranged to form an image on a light measuring sensor 8. A shutter 10 is arranged to control the amount of exposure light to which a film 11 is to be exposed. The film 11 is a photosensitive material. A focus detecting device 12 is disposed at a lower part of the camera body 1.

In FIG. 5A, reference numeral 17 denotes a release button. Reference numerals 20 to 23 denote attitude detecting switches arranged to detect the attitude of the camera body 1.

In the camera body 1, the main mirror 4 is arranged between the photo-taking lens 3 and the shutter 1 to be vertically swingable. When the user of the camera is observing an object to be photographed, the main mirror 4 is obliquely set at an observing position within the phototaking optical path and acts to guide the object image from the photo-taking lens 3 to the viewfinder optical system in such a way as to enable the user to see an object image and also to permit a light measuring action by means of the light measuring sensor 8.

A central part of the main mirror 4 is formed to be a half mirror. The submirror 5 is swingably mounted behind the half-mirror part of the main mirror 4. Image information on the object obtained from the photo-taking lens 3 passes through the half-mirror part of the main mirror 4 to be reflected and guided by the submirror 5 to the focus detecting device 12.

In taking a picture, to prevent the object image from the photo-taking lens 3 from being eclipsed by the main mirror 4 and the submirror 5, the main mirror 4 is swung upward into a retracted position located outside of the photo-taking optical path. Then, the submirror 5 is swung in the direction of covering and closing the half-mirror part of the main mirror 4. At the time of exposing the film 11 to light for photo-taking, this arrangement effectively prevents an apposite exposure action on the film 11 from being hindered by any light ingressing from the viewfinder optical system. After that, the exposure action is carried out on the film 11 by opening and closing the shutter 10.

After completion of the exposure, to promptly permit observation of the object and light-measuring and focus-detecting actions for the next shot, the main mirror 4 and the submirror 5 are brought back to the observing position before photo-taking, in response to an exposure completion signal.

The main mirror 4 is urged to move downward (toward the observing position) by means of a spring (not shown). When a member which is pushing the main mirror 104 upward is released from the pushing action, the main mirror 104 is caused by an urging force of the spring to swing downward back to the observing position. Then, the submirror 105 is also caused by the urging force of the spring to swing in the direction of opening with respect to the main mirror 4 and thus comes back to its position shown in FIG. 1A.

In the above sequence of actions of the camera, a period of time required after the exposure completion signal is outputted until the main mirror 4 is stably positioned in the observing position to permit light-measuring and focus-detecting actions, etc., for the next shot, i.e., the mirror stabilization time required after the main mirror 4 and the submirror 5 are driven by the spring to the observing position until the main mirror 4 and the submirror 5 cease to bounce to lay at rest, varies with the attitude of the camera. The reason for this is as follows.

Each of the main mirror 4 and the submirror 5 has a certain amount of mass, and the relation of the urging direction of the spring for driving the main mirror 4 and the submirror 5 to the direction of their dead weight (the direction of receiving the gravitational force) varies with the attitude of the camera.

Therefore, a length of time during which the mirrors 4 and 5 are driven and another length of time during which the the mirrors 4 and 5 bounce continues vary according to the attitude of the camera.

FIGS. 2A to 2C show the movement of the main mirror 4 and the submirror 5 taking place after the exposure completion signal is outputted. FIG. 2A shows the movement of the mirrors 4 and 5 taking place with the camera in a normal attitude, in which the pentagonal roof prism 6 is facing upward. FIG. 2B shows the movement of the mirrors 4 and 5 taking place with the camera in a lens-down attitude, in which the photo-taking lens 3 is facing downward. FIG. 2C shows the movement of the mirrors 4 and 5 taking place with the camera in an inverted (upside-down) attitude, in which the pentagonal roof prism 6 is facing downward.

In each of the cases shown in FIGS. 2A to 2C, after the main mirror 4 and the submirror 5 begin to be driven with the exposure completion signal outputted, the mirrors 4 and 5 collide against stoppers (not shown) disposed at the observing position, and then bounce some number of times on the stoppers before the mirrors 4 and 5 come to rest in the observing position. The mirror stabilization time, which is required after the output of the exposure completion signal until the mirrors 4 and 5 come to lay at rest in the observing position, was found, by tests, to be "ta","tb" or "tc",as shown in FIG. 2A, 2B or 2C.

As apparent from FIGS. 2A to 2C, the mirror stabilization time "tb" required with the camera in the lens-down attitude as shown in FIG. 2B is approximately equal to the mirror stabilization time "tc" required with the camera in the inverted attitude as shown in FIG. 2C, and is longer than the mirror stabilization time "ta" required with the camera in the normal attitude as shown in FIG. 2A.

Figure 6A:
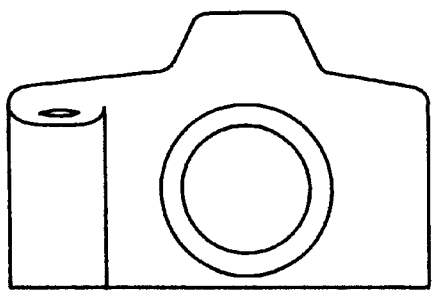
FIGS. 6A, 6B, 6C, 6D, 6E and 6F are diagrams showing different attitudes of the camera.
Figure 6B:
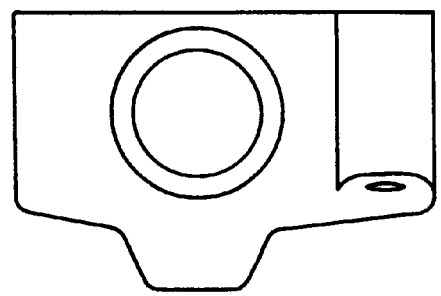
Figure 6C:
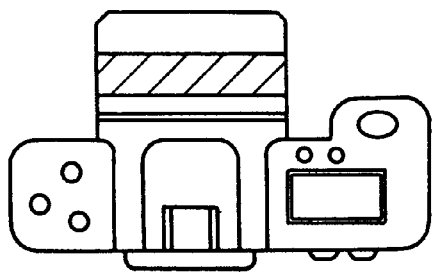
Figure 6D:
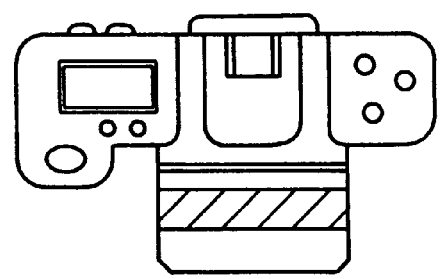
Figure 6E:
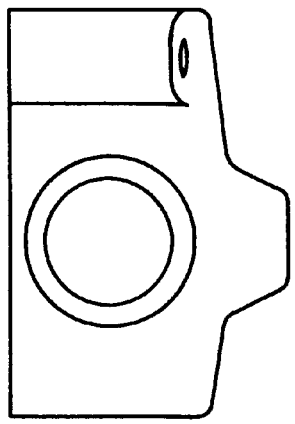
Figure 6F:
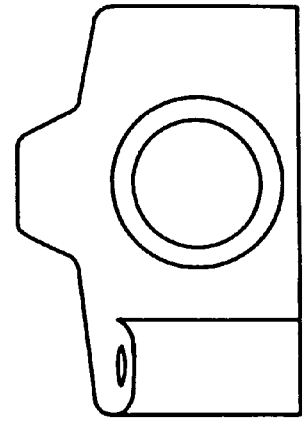

Further, in cases where the camera is in other attitudes, i.e., vertical attitudes shown in FIGS. 6E and 6F and a lens-up attitude in which the photo-taking lens 3 is facing upward as shown in FIG. 6C, the mirror stabilization time was found, by tests, to be about the same as the mirror stabilization time "ta" required with the camera in the normal attitude as shown in FIG. 2A.

According to the embodiment of the invention, the attitudes of the camera are divided, on the basis of the above test data, etc., into an attitude-A group which requires a shorter period of mirror stabilization time (the normal attitude, the lens-up attitude and the vertical attitudes) and an attitude-B group which requires a longer period of mirror stabilization time (the inverted attitude and the lens-down attitude). Then, a continuous photo-taking operation is controlled while taking into consideration the attitude-A group and the attitude-B group, as will be further described later.

A method for detecting the attitude of the camera is next described below with reference to FIGS. 3A to 3C to FIGS. 7A and 7B.

Figure 3A:
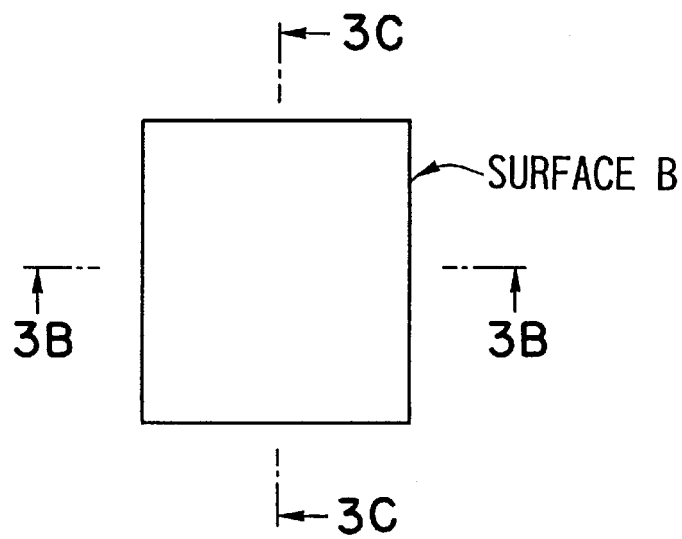
FIGS. 3A, 3B and 3C are diagrams showing the construction of each of attitude detecting switches in the camera.
Figure 3B:
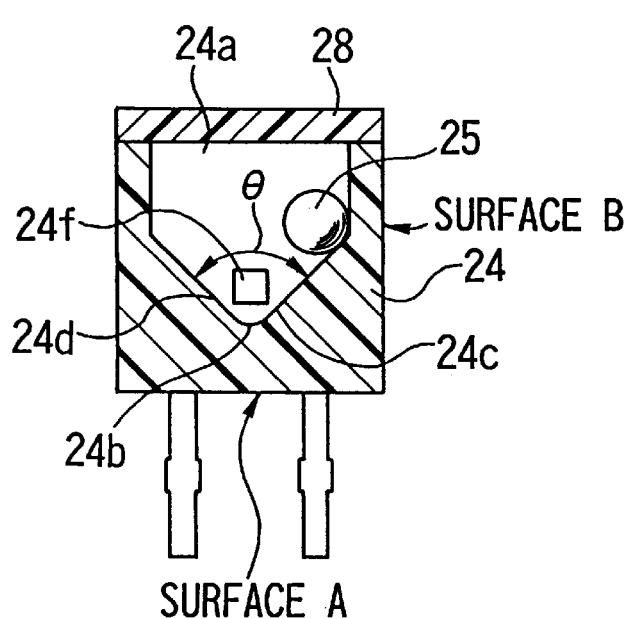
Figure 3C:
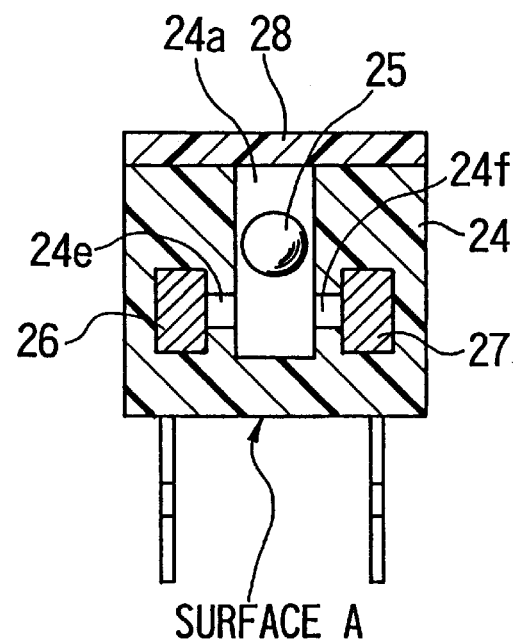

FIGS. 3A, 3B and 3C show the construction of each of the attitude detecting switches 20 to 23, which are provided in the camera and have the same construction. FIG. 3A is a plan view showing the attitude detecting switch. FIG. 3B is a sectional view of the attitude detecting switch taken on a line C—C shown in FIG. 3A. FIG. 3C is a sectional view of the attitude detecting switch taken on a line D—D shown in FIG. 3A.

Referring to FIGS. 3B and 3C, a switch body 24 is formed with plastic. A groove part 24a is formed in the switch body 24. A steel ball 25 is disposed in the groove part 24a. The steel ball 25 is freely rollable within the groove part 24a.

As shown in FIG. 3C, the groove part 24a has a width slightly wider than the diameter of the steel ball 25, as viewed in the direction of the section D—D. As viewed on the section C—C, the groove part 24a is approximately in a V shape composed of first and second slanting surfaces 24c and 24c and a vertex part 24b. A light projecting window 24e for a photodiode 26 and a light receiving window 24f for a phototransistor 27 are formed in the neighborhood of the vertex part 24b in such a way as to confront each other. The angle θ of the V shape of the groove part 24a is about 90 degrees. A lid 28 is fixed by bonding to the upper part of the switch body 24 to have the steel ball 25 sealed within the groove part 24a.

For the sake of defining the directions taken by the attitude detecting switches 20 to 23, the lower side surface of the switch body 24 as shown in FIG. 3B is assumed to be a surface A and a right side surface of the switch body 24 as shown in FIG. 3B is assumed to be a surface B.

Figure 4A:
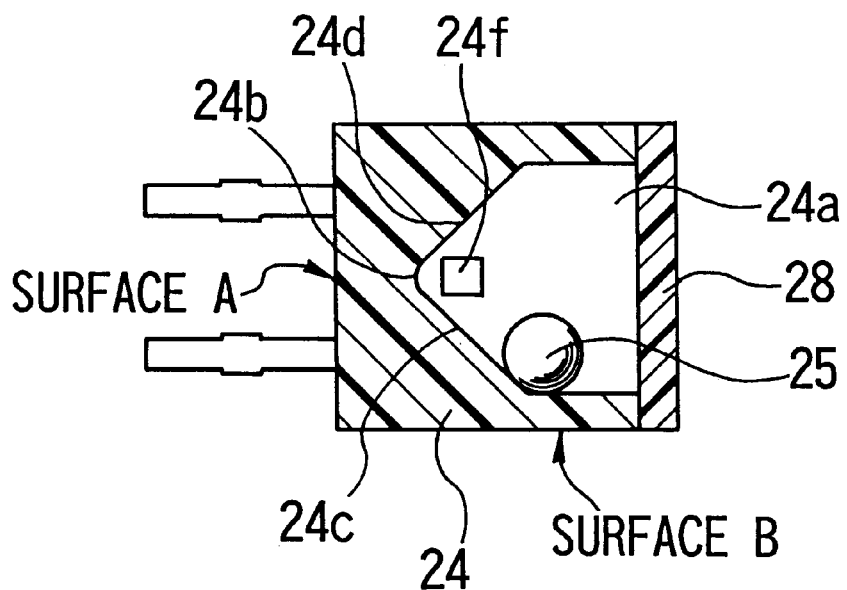
FIGS. 4A and 4B are diagrams showing the construction of the attitude detecting switch in the camera.
Figure 4B:
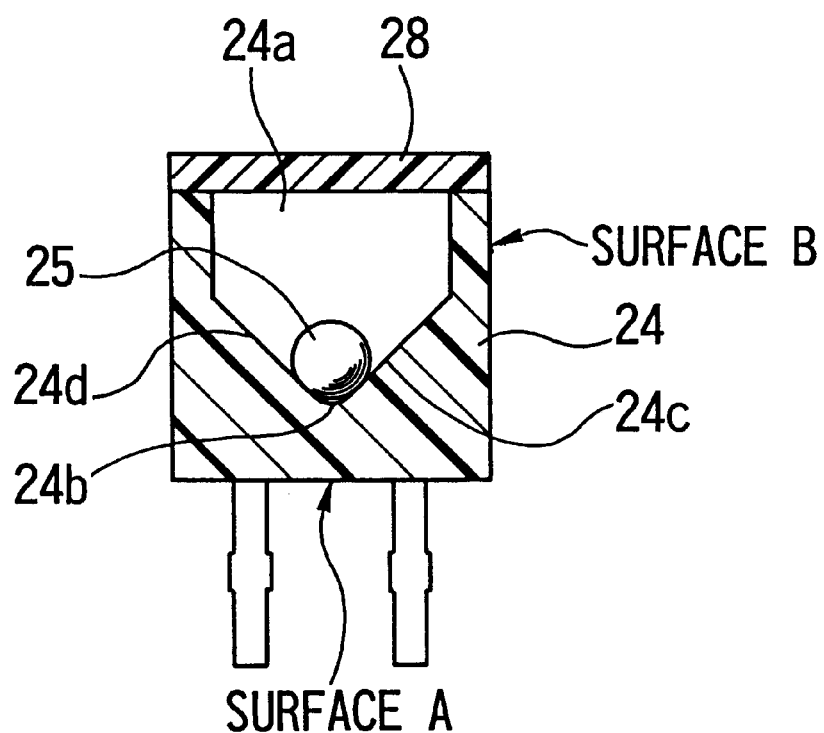

Each of the attitude detecting switches 20 to 23 operates as described below with reference to FIGS. 4A and 4B. FIG. 4A shows the attitude detecting switch as in a state having the surface B downward. FIG. 4B shows the attitude detecting switch as in a state having the surface A downward.

When the attitude detecting switch is in the state shown in FIG. 4A, the steel ball 25 is caused by gravity to roll downward within the groove part 24a. Therefore, in this state, the optical path between the light projecting window 24e and the light receiving window 24f is never blocked by the steel ball 25.

When the attitude detecting switch is in the state shown in FIG. 4B, the steel ball 25 is caused by gravity to roll down within the groove part 24a toward the vertex part 24b. Therefore, in that state, the optical path between the light projecting window 24e and the light receiving window 24f is blocked by the steel ball 25.

Generally, when the vertex part 24b is located at the lowest position within the groove part 24a, the steel ball 25 rolls to a part near to the vertex part 24b to block the optical path between the light projecting window 24e and the light receiving window 24f.

In the description of the present embodiment given hereinafter, the state in which the steel ball 25 is located near the vertex part 24b to block the optical path between the photodiode 26 and the phototransistor 27 as shown in FIG. 4B will be called a state "1". The state in which the steel ball 25 is not located in the neighborhood of the vertex part 24b and thus the optical path between the photodiode 26 and the phototransistor 27 is left unblocked will be called a state "0".

The photodiode 26 and the phototransistor 27 which are disposed within the attitude detecting switch are arranged to be driven by an attitude-detecting-switch driving circuit (not shown). A microcomputer which will be described later herein is arranged to detect the output of the phototransistor 27 by controlling the attitude-detecting-switch driving circuit. The state of each attitude detecting switch is thus judged by the microcomputer to be in the state "1" or in the state "0" according to the detection output thus obtained.

In actuality, the steel ball 25 has some rolling resistance. Therefore, in cases where the first slant surface 24c is located lower than the second slant surface 24c and is approximately horizontal, or where the second slant surface 24c is located lower than the first slant surface 24c and is approximately horizontal, or where both the first and second slant surfaces 24c and 24c are approximately horizontal, the steel ball 25 is not always located in the neighborhood of the vertex part 24b. In other words, the attitude detecting switch then cannot be definitely found to be in the state "0" or in the state "1". Such a state hereinafter will be called an unstable state.

Figures 5B, 5C:
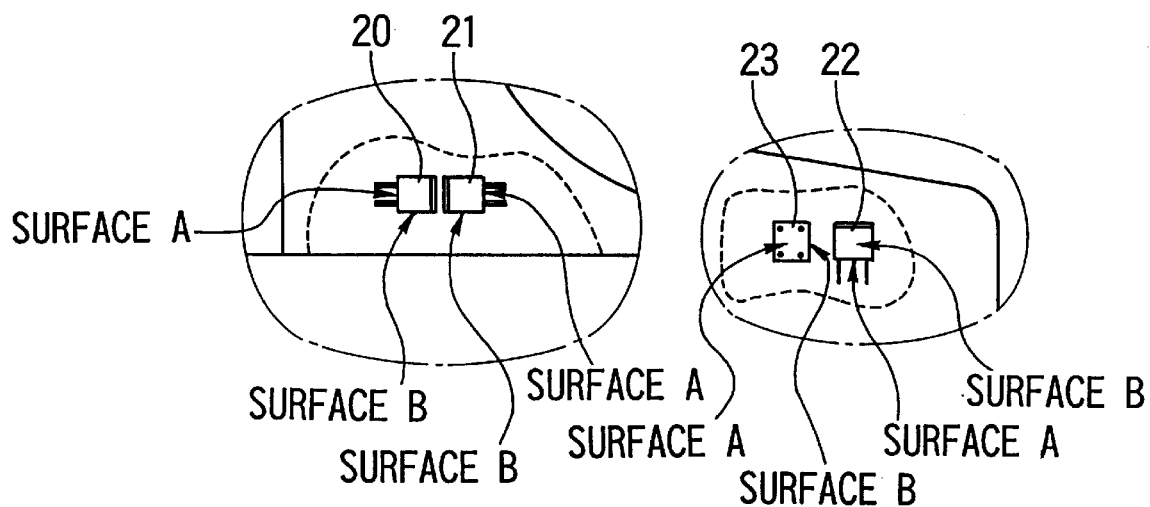

The allocation of the attitude detecting switches 20 to 23 with respect to the camera body 1 is next described as follows. FIG. 5A is a front view of the camera showing the allocation of the attitude detecting switches 20 to 23. FIGS. 5B and 5C are enlarged views respectively showing parts E and F of FIG. 5A.

As shown in FIG. 5A, which is a front view of the camera, the first and second attitude detecting switches 20 and 21 are allocated at a lower left part of a photo-taking optical axis and below a shutter driving mechanism (not shown). Further, as viewed from the front side of the camera body 1, the third and fourth attitude detecting switches 22 and 23 are allocated at an upper right part of the photo-taking optical axis and above a film cartridge chamber (not shown).

The first attitude detecting switch 20 is in a position, as viewed from the front of the camera, where its surface A is facing the left side of the camera and its surface B is facing the lower side of the camera.

The second attitude detecting switch 21 is in a position, as viewed from the front of the camera, where its surface A is facing the right side of the camera and its surface B is facing the lower side of the camera.

The third attitude detecting switch 22 is in a position where its surface A is facing the lower side of the camera and its surface B is facing the front side of the camera.

The fourth attitude detecting switch 23 is in a position where its surface A is facing the front side of the camera and its surface B is facing the right side of the camera, as viewed from the front side of the camera.

The states of each of the attitude detecting switches 20 to 23 for various attitudes of the camera are next described with reference to FIGS. 6A to 6F. FIG. 6A shows the camera as in the normal attitude. FIG. 6B shows the camera as in the inverted (upside-down) attitude. FIG. 6C shows the camera as in the lens-up attitude. FIG. 6D shows the camera as in the lens-down attitude. FIG. 6E shows the camera as in a grip-up attitude, in which the camera is in a vertical attitude having its grip part located uppermost. FIG. 6F shows the camera as in a grip-down attitude, in which the camera is in another vertical attitude having its grip part located lowermost.

When the camera is in the normal attitudes as shown in FIG. 6A, the first attitude detecting switch 20 is in the state "0", the second attitude detecting switch 21 in the state "0" and the third attitude detecting switch 22 in the state "1". In this case, the fourth attitude detecting switch 23 is in the unstable state, as both the first slant surface 24c and the second slant surface 24c within the fourth attitude detecting switch 23 are approximately horizontal to make the position of the steel ball 25 unstable.

When the camera is in the inverted (upside-down) attitude as shown in FIG. 6B, the first attitude detecting switch 20 is in the state "0", the second attitude detecting switch 21 in the state "0" and the third attitude detecting switch 22 also in the state "0", while the fourth attitude detecting switch 23 takes the unstable state.

When the camera is in the lens-up attitude as shown in FIG. 6C, the first attitude detecting switch 20 and the second attitude detecting switch 21 take the unstable state, while the third attitude detecting switch 22 is in the state "0" and the fourth attitude detecting switch 23 is also in the state "0".

When the camera is in the lens-down attitude as shown in FIG. 6D, both the first attitude detecting switch 20 and the second attitude detecting switch 21 take the unstable state, while the third attitude detecting switch 22 is in the sate "0" and the fourth attitude detecting switch 23 in the state "1".

When the camera is in the grip-up (vertical) attitude as shown in FIG. 6E, the first attitude detecting switch 20 is in the state "0", the second attitude detecting switch 21 is in the state "1", the third attitude detecting switch 22 is in the unstable state, and the fourth attitude detecting switch 23 in the state "0".

When the camera is in the grip-down (vertical) attitude as shown in FIG. 6F, the first attitude detecting switch 20 is in the state "1", the second attitude detecting switch 21 is in the state "0", the third attitude detecting switch 22 is in the unstable state, and the fourth attitude detecting switch 23 is in the state "0".

FIG. 7A is a table showing the above-stated attitudes of the camera in relation to the states of the attitude detecting switches mentioned above. While the states of the four attitude detecting switches, i.e., the first to fourth attitude detecting switches 20 to 23, have 16 conceivable combinations, the table of FIG. 7A includes only 12 combinations of the states of the switches.

The four combinations of the states of the attitude detecting switches which are excluded from the table of FIG. 7A are as follows. (1) A case where the states of the attitude detecting switches 20 to 23 are, serially from the first attitude detecting switch 20, in a combination of "1", "1", "1" and "0": It is possible to have the first and second attitude detecting switches 20 and 21 both in the state "1" only when the camera is in the lens-up or lens-down attitude. However, with the camera in each of the two attitudes, the third attitude detecting switch 22 necessarily takes the state "0" without fail. In other words, this combination is normally impossible and is conceivable only when there is some abnormality in respect to the attitude detecting switches, the attitude-detecting-switch driving circuit, etc.

(2) A case where the states of the attitude detecting switches 20 to 23 are, serially from the first attitude detecting switch 20, in a combination of "1", "0", "1" and "1": This combination is conceivable when the attitude of the camera is between the normal attitude, the lens-down attitude and the grip-down vertical attitude. In this case, the first slant surface 24c in the first attitude detecting switch 20, the first slant surface 24c in the third attitude detecting switch 22 and the second slant surface 24c in the fourth attitude detecting switch 23 all become approximately horizontal to have the respective steel balls 25 in the unstable state.

(3) A case where the states of the attitude detecting switches 20 to 23 are, serially from the first attitude detecting switch 20, in a combination of "0", "1","1" and "1": this combination is conceivable when the camera is between the normal attitude, the lens-down attitude and the grip-up vertical attitude. In that case, the first slant surface 24c in the second attitude detecting switch 21, the first slant surface 24c in the third attitude detecting switch 22, the first slant surface 24c in the fourth attitude detecting switch 23 all become approximately horizontal to have the respective steel balls 25 in the unstable state.

(4) A case where the states of the attitude detecting switches 20 to 23 are, serially from the first attitude detecting switch 20, in a combination of "1", "1", "1" and "1": This combination is normally impossible for the same reason as in the case of the above-stated combination (1). The combination (4) is conceivable only when the attitude detecting switches or the attitude-detecting-switch driving circuit is in an abnormal state.

FIG. 7B is a table recapitulating the correlation of combinations of states of the attitude detecting switches and the attitudes of the camera as shown in FIG. 7A and described above.

Figure 9:
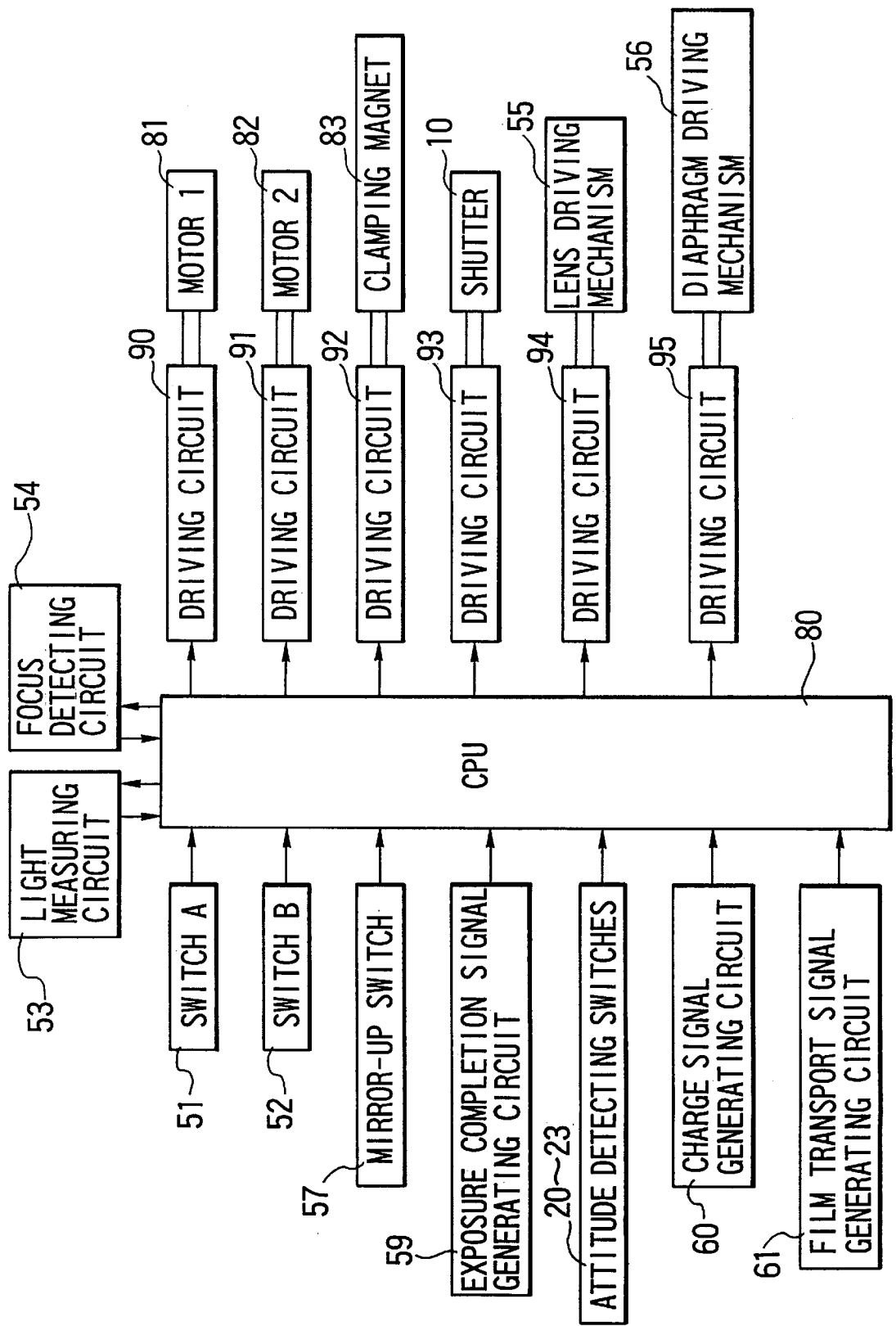
FIG. 9 is a block diagram showing the electrical circuit arrangement of the camera.

FIG. 9 shows the electrical circuit arrangement of the camera according to the embodiment of the invention. In FIG. 9, reference numeral 80 denotes a central processing unit (hereinafter referred to as the CPU). Reference numerals 90 to 95 denote driving circuits arranged for control over motors, a magnet, etc., according to signals from the CPU 80.

Referring to FIG. 9, a motor 1 (81) is a charge motor serving as a drive source for a charging action on the shutter, etc. A motor 2 (82) is a film transport motor serving as a drive source for film transport.

A clamping magnet 83 is arranged to lock a lever (not shown) which is arranged to resiliently raise the main mirror 4, when a coil of the clamping magnet 83 is not energized, and to unlock the lever when the coil is energized.

A lens driving mechanism 55 is arranged to drive the photo-taking lens 3 in the direction of an optical axis with a built-in motor (not shown). A diaphragm driving mechanism 56 is arranged to drive a diaphragm (not shown) disposed within the photo-taking lens 3 to open and close the diaphragm with a built-in motor (not shown).

A switch A (51) is arranged to cause various detecting actions, such as light-measuring and focus-detecting actions, to begin by turning on when the release button 17 is pushed halfway. A switch B (52) is arranged to cause a shutter opening-and-closing action, i.e., a photo-taking action, to begin by turning on when the release button 17 is pushed to a full extent.

A light measuring circuit 53 is arranged to measure the light of an object of shooting on the basis of the output of the light measuring sensor 8. A focus detecting circuit 54 is arranged to detect the state of focus for a predetermined focus detecting area on the basis of the output of a CCD or the like arranged within the focus detecting device 12.

A mirror-up switch 57 is arranged to detect completion of an action of driving the main mirror 4 from the observing position to the retracted position.

An exposure completion signal generating circuit 59 is arranged to output an exposure completion signal indicating that an exposure action on the film 11 has finished by opening and closing the shutter 10. A charge signal generating circuit 60 is arranged to output a charge signal which indicates completion of a charging action on the shutter 10 to be performed before the shutter operating action. A film transport signal generating circuit 61 is arranged to output a film transport signal indicating that one frame portion of the film 11 has been wound up after completion of an exposure action on the frame.

Figure 8:
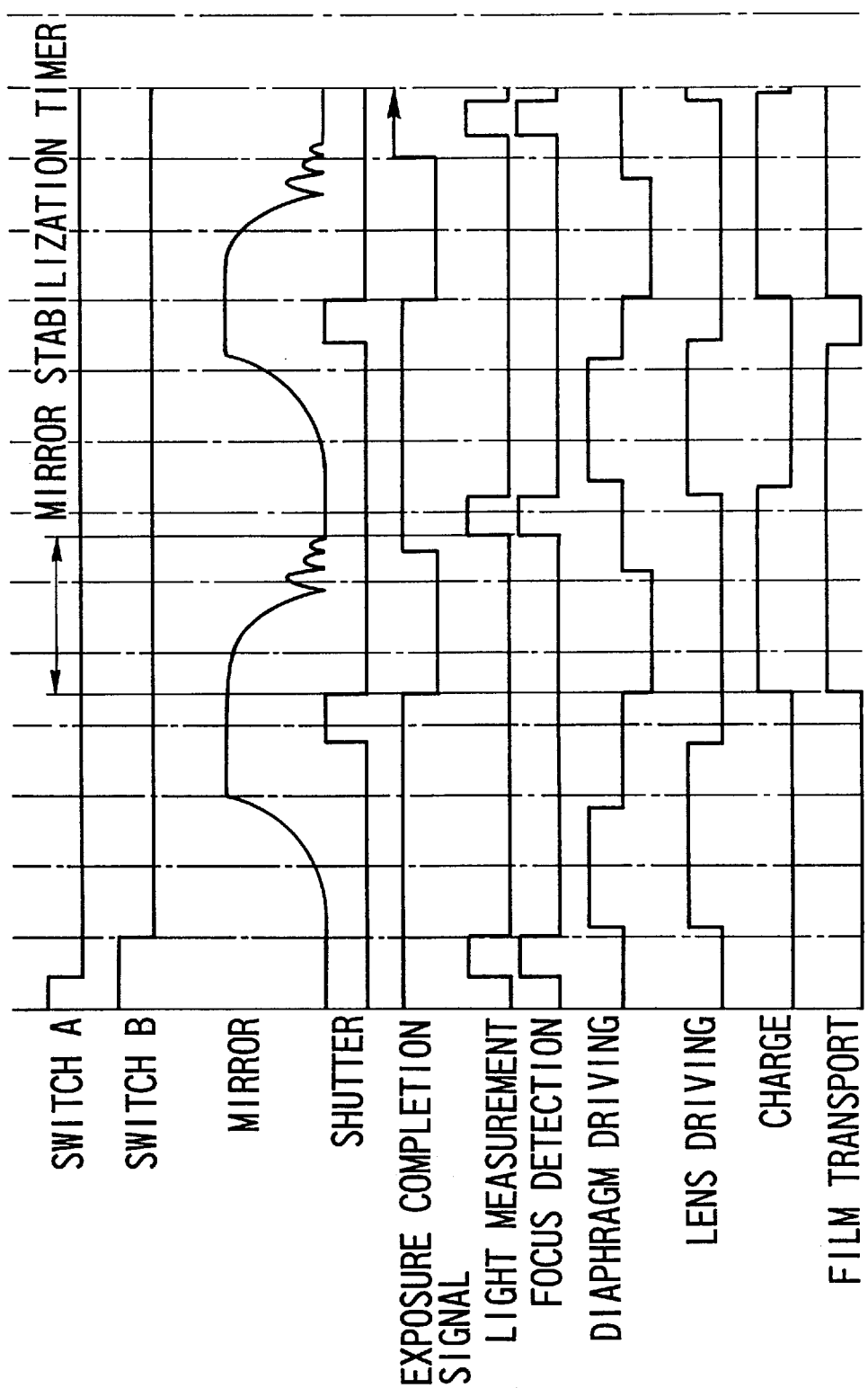
FIG. 8 is a timing chart showing a continuous photo-taking operation of the camera.

A continuous shooting (photo-taking) operation of the camera is next described with reference to FIG. 10, which is a flow chart, and FIG. 8, which is a timing chart.

Figure 10:
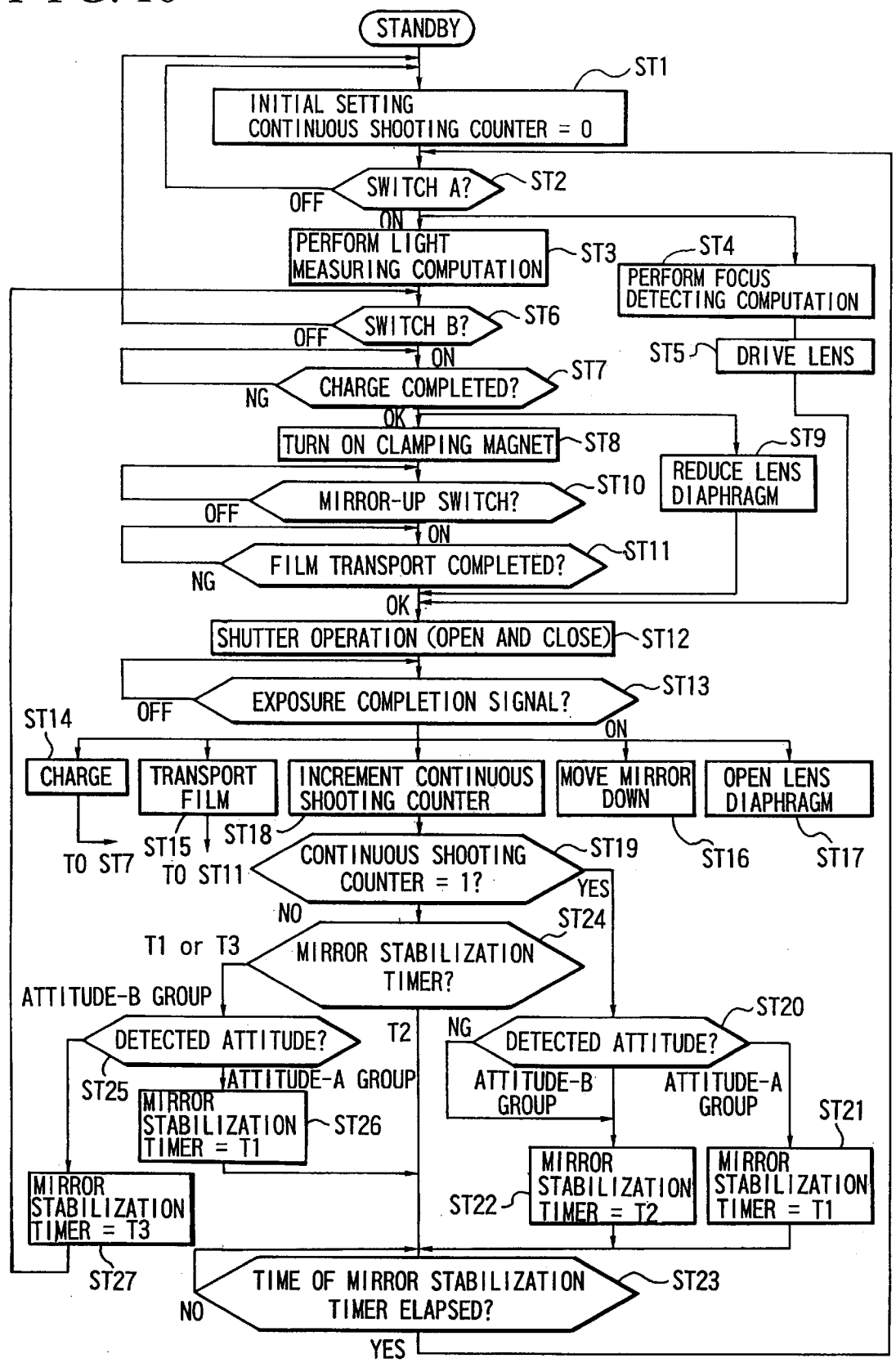
FIG. 10 is a flow chart showing actions of the camera to be performed during the continuous photo-taking operation.
Figure 11:
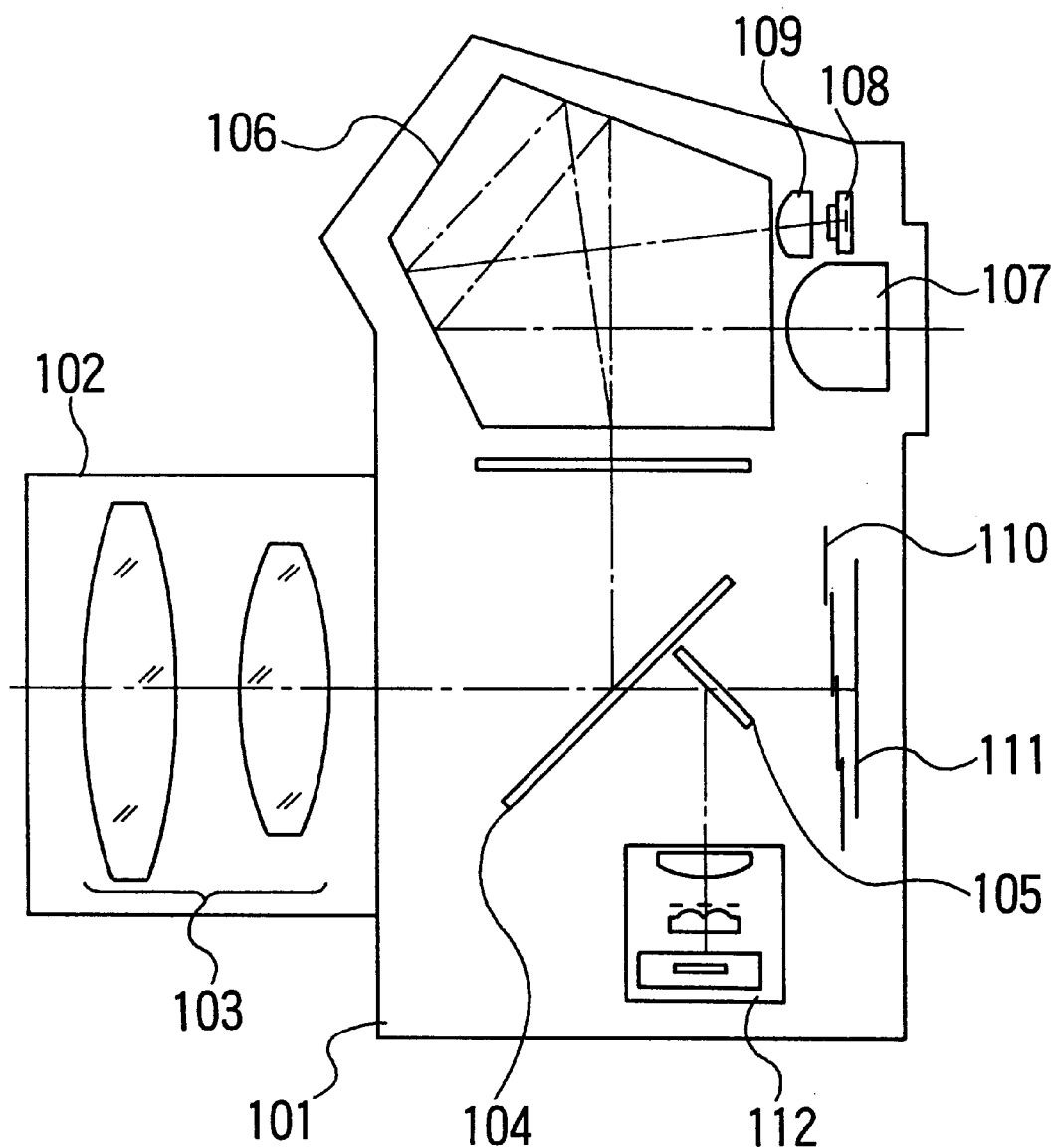
FIG. 11 is a sectional view showing essential parts of a conventional camera.

At a step ST1 shown in FIG. 10, when the power supply (not shown) of the camera is turned on, a counter arranged to count the number of photo-taking frames used for continuous shooting is set at "0" as initial setting. At a step ST2, a check is made to find if the switch A (51) is tuned on with the release button 17 pushed halfway. If so, the flow of operation proceeds to a step ST3. At the step ST3, upon detection of the on-state of the switch A (51), the CPU 80 causes the light measuring circuit 53 to start operating and performs a light measuring arithmetic operation on the output of the light measuring circuit 53. At a step ST4, at the same time, the focus detecting circuit 54 is also caused to start operating and a focus detecting arithmetic operation is performed on the output of the focus detecting circuit 54. At a step ST5, the driving circuit 94 and the lens driving mechanism 55 are caused to drive the photo-taking lens 3 to carry out focus adjustment.

At a step ST6, a check is made to find if the switch B (52) is turned on with the release button 17 pushed fully. If so, the flow proceeds to a step ST7. At the step ST7, upon detection of the on-state of the switch B (52), the CPU 80 makes a check for a signal from the charge signal generating circuit 60 indicating completion of charging. At a step ST8, the coil of the clamping magnet 83 is energized to unlock the lever (not shown) and to cause the main mirror 4 to spring up into the retracted position by the lever. At a step ST9, at the same time, the diaphragm driving mechanism 56 is caused through the driving circuit 95 to stop the diaphragm of the photo-taking lens 3 down to a predetermined aperture position.

At a step ST10, a check is made to find if the mirror-up switch 57 has been turned on by the completion of driving the main mirror 4 to the retracted position. If so, the flow proceeds to a step ST11. At the step ST11, a check is made for a signal from the film transport signal generating circuit 61 to find if a film transport action has finished. If so, the flow proceeds to a step ST12. At the step ST12, upon completion of the diaphragm and lens driving actions, the shutter 10 is operated to carry out a film exposure by operating the shutter 10.

At a step ST13, a check is made for an exposure completion signal from the exposure completion signal generating circuit 59 to find if the exposure has been finished by operating the shutter 10. If so, the flow proceeds to steps ST14, ST15, ST16, ST17 and ST18 at the same time. At the step ST14, the CPU 80 causes, through the driving circuit 90, the motor 1 (81) to charge the shutter 10, etc. At the step ST15, the motor 2 (82) is caused through the driving circuit 91 to carry out a one-frame winding action on the film 11. At the step ST16, the member (not shown) which has been pushing the main mirror 4 up to the retracted position is freed to allow the main mirror 4 to begin to move to the observing position. At the step ST17, the diaphragm (not shown) is returned to the open position. Further, in order to find the lapse of mirror stabilization time from the time point at which the exposure completion signal is outputted, a mirror stabilization timer which is arranged to count the mirror stabilization time is caused to start counting.

At the step ST18, the continuous shooting counter is also caused, at the same time, to perform upward counting. As a result, the count value of the continuous shooting counter becomes "1" upon completion of the exposure action on the first frame of the continuous shooting (photo-taking) operation.

At the next step ST19, a check is made to find if the count value of the continuous shooting counter is at "1". If so, that is, upon completion of the first shot of the continuous shooting, the flow proceeds to a step ST20. At the step ST20, a check is made to find if the attitude of the camera belongs to the above-stated attitude-A group or the attitude-B group, on the basis of the above-stated combinations of the outputs of the attitude detecting switches 20 to 23.

If the attitude of the camera is found to belong to the attitude-A group, the flow proceeds to a step ST21 to set the mirror stabilization timer at "T1" which is 50 ms. If the attitude of the camera is found to belong to the attitude-B group, the flow proceeds to a step ST22 to set the mirror stabilization timer at "T2" which is 80 ms.

At a step ST23, a check is made for the lapse of the mirror stabilization time as counted by the mirror stabilization timer. After the lapse of the mirror stabilization time, the flow returns to the step ST2 to find if the switch A (51) continues to be in its on-state. If so, the flow proceeds to the steps ST3 and ST4 to cause the light measuring circuit 53 and the focus detecting circuit 54 to start their actions for the second shot (frame) of the continuous shooting. Then, the light measuring and focus detecting arithmetic operations are carried out. At the step ST5, the lens is driven for focus adjustment on the basis of the result of the focus detecting arithmetic operation. Further, if the switch B (52) is found at the step ST6 to be still in its on-state, the flow proceeds to the step ST7 to make a check for the signal from the charge signal generating circuit 60 to find if charging has been finished. If so, the flow proceeds to the steps ST8 and ST9 to drive the main mirror 4 to the retracted position and, at the same time, to stop the diaphragm of the lens down to a predetermined aperture position. The flow then proceeds to the step ST10 to find completion of the process of driving the main mirror 4 to the retracted position, and to the step ST11 to find completion of the process of winding one frame of the film 11. At the step ST12, the shutter 10 is caused to be operated (opened and closed) after completion of diaphragm and lens driving processes. Accordingly, an exposure is carried out for the second shot of the continuous shooting.

When the exposure completion signal is found at the step ST13 to have been outputted after completion of the shutter operation, the CPU 80 causes the motor 1 (81) to be actuated to charge the shutter, etc., at the step ST14 and also causes the motor 2 (82) to be actuated to perform the one-frame winding action on the film 11 at the step ST15.

At the same time, the member pushing up the main mirror 4 to the retracted position is freed to have the main mirror 4 moved to the observing position at the step ST16, and the aperture position of the lens diaphragm is caused to come back to its full open position at the step ST17. Then, the mirror stabilization timer which is provided for detecting the lapse of mirror stabilization time from the time point at which the exposure completion signal is outputted is caused to begin counting.

Further, the count value of the continuous shooting counter is incremented at the step ST18, and a check is made at the step ST19 to find if the count by the continuous shooting counter is at "1".

If the count value of the continuous shooting counter is found not "1", that is, if the continuous shooting is made for the second frame (shot) or more, the flow of operation proceeds from the step ST19 to a step ST24. At the step ST24, a check is made for the setting value of the mirror stabilization timer set for the shot of the preceding frame. If the setting value of the mirror stabilization timer is found to be the value T2, no attitude detecting action is performed, and the setting value of the mirror stabilization timer is kept as it is. The flow then proceeds from the step ST24 to the step ST23. Then, after the lapse of the setting value of the mirror stabilization timer, the flow returns to the step ST2 to make the check for the state of the switch A (51) and to repeat the same steps for the continuous shooting operation.

Further, if the mirror stabilization timer is found at the step ST24 to be set at the value T1, the flow proceeds to a step ST25 to detect the attitude of the camera in the same manner as the step ST20. If the attitude of the camera is found to belong to the attitude-A group, the flow proceeds to a step ST26. At the step ST26, the mirror stabilization timer is left at the setting value T1, and the flow proceeds from the step ST26 to the step ST23. If the attitude of the camera is found at the step ST25 to have changed to the attitude-B group, the flow proceeds from the step ST25 to a step ST27. At the step ST27, the setting value of the mirror stabilization timer is changed to a setting value T3 (0 ms). The flow then proceeds from the step ST27 to the step ST6 to make the check for the state of the switch B (52), without performing the light measuring action and the focus detecting action. If the switch A (51) and the switch B (52) are found to still remain in their on-states, the continuous shooting operation is further performed on frames one after another by using, as exposure data, the results of light-measuring and focus-detecting arithmetic operations for the exposure of the first frame for the exposure of the second and subsequent frames.

However, if the attitude of the camera comes to be found at the step ST25 to have changed back to the attitude-A group while the continuous shooting is carried on using the setting value T3 of the mirror stabilization timer, the flow proceeds to the step ST26 to set the mirror stabilization timer at the value T1 again for further carrying on the continuous shooting operation.

If the switch B (52) is turned off, the continuous shooting operation is considered to have been suspended, and the flow returns to the step ST1 to set the continuous shooting counter at the initial setting value "0". When the switches A (51) and B (52) are again turned on, continuous shooting is performed from the shot of the first frame.

As described above, according to the embodiment of the invention, with the attitude of the camera found to belong to the attitude-A group (for example, the normal attitude) in taking a shot for the first fame of continuous shooting, if the attitude of the camera has changed to the attitude-B group (for example, the lens-down attitude) in process of the continuous shooting, the setting value of the mirror stabilization timer is changed from the value T1 to the value T3, and the continuous shooting is continued on the basis of the measured light value and the focus position used in taking a shot for the preceding frame without performing the light-measuring and focus-detecting actions. Then, if the attitude of the camera has again come back to the attitude-A group, the value of the mirror stabilization timer is changed from the setting value T3 to the value T1. In this instance, the light-measuring and focus-detecting actions are performed and a shot is taken for the next frame on the basis of the results of these actions. As apparent from the timing chart of FIG. 8, the length of time required for the light-measuring and focus-detecting actions is extremely short. Therefore, there is not much difference in frame feeding speed between the shot taken by performing the light-measuring and focus-detecting actions and the shot taken without these actions. In other words, in this instance, the high-speed continuous shooting operation can be carried out at a constant interval between shots despite of the change in attitude of the camera.

Further, with the attitude of the camera found to belong to the attitude-B group in taking a shot for the first fame of continuous shooting, if the attitude of the camera has changed to the attitude-A group in process of the continuous shooting, the light-measuring and focus detecting actions are carried out while keeping the setting value of the mirror stabilization timer at the value T2 as it is, and the continuous shooting is carried on the basis of the results of these actions. Further, in that instance, no attitude detecting action is performed thereafter. Therefore, although the frame feeding speed of the continuous shooting is slower by 30 ms than in the case of the high-speed continuous shooting operation, the continuous shooting can be steadily carried on at a constant speed.

According to the arrangement of the embodiment as described above, when the attitude of the camera has changed in process of continuous shooting, the frame feeding speed of the continuous shooting is stabilized according to the attitude of the camera in which the first shot of the continuous shooting has been taken, so that the frame feeding speed can be prevented from unexpectedly changing. The arrangement thus effectively prevents intervals between shots from varying with the attitude of the camera to give a disagreeable feeling to the operator of the camera.

What is claimed is:

1. A camera comprising:
    a) a movable mirror which moves between a mirror-down position and a mirror-up position;
    b) an attitude detecting device which detects an attitude of the camera; and
    c) a control circuit in which a plurality of periods of stabilization time of said movable mirror are set and which changes over the stabilization time of said movable mirror among the plurality of periods according to a result of detection provided by said attitude detecting device,
        wherein, if the attitude of the camera has changed in process of a continuous photo-taking operation, said control circuit keeps the stabilization time of said movable mirror set at the time of start of the continuous photo-taking operation without changing over the stabilization time of said movable mirror.

2. A camera according to claim 1, wherein said attitude detecting device detects a direction of gravity acting on the camera.

3. A camera according to claim 1, wherein said movable mirror is influenced by gravity when moving from the mirror-up position to the mirror-down position.

4. A camera according to claim 1, wherein the stabilization time of said movable mirror is a period of time required for said movable mirror moving from the mirror-up position to the mirror-down position.

5. A camera comprising:
    a) a movable mirror which moves between a mirror-down position and a mirror-up position;
    b) an attitude detecting device which detects an attitude of the camera; and
    c) a control circuit in which a first period of stabilization time and a second period of stabilization time that is longer than the first period of stabilization time are set as stabilization time of said movable mirror and which changes over the first period of stabilization time and the second period of stabilization time according to a result of detection provided by said attitude detecting device,
        wherein, if the stabilization time of said movable mirror set at the time of start of a continuous photo-taking operation is the second period of stabilization time, said control circuit keeps the second period of stabilization time without changing over the stabilization time of said movable mirror, even if the attitude of the camera has changed in process of the continuous photo-taking operation.

6. A camera according to claim 5, wherein said attitude detecting device detects a direction of gravity acting on the camera.

7. A camera according to claim 5, wherein said movable mirror is influenced by gravity when moving from the mirror-up position to the mirror-down position.

8. A camera according to claim 5, wherein the stabilization time of said movable mirror is a period of time required for said movable mirror moving from the mirror-up position to the mirror-down position.

9. A camera according to claim 5, wherein, if the stabilization time of said movable mirror set at the time of start of the continuous photo-taking operation is the second period of stabilization time, said attitude detecting device is inhibited from performing an attitude detecting operation during process of the continuous photo-taking operation.

10. A camera according to claim 5, wherein, if the stabilization time of said movable mirror set at the time of start of the continuous photo-taking operation is the first period of stabilization time, said attitude detecting device is allowed to perform an attitude detecting operation during process of the continuous photo-taking operation.

11. A camera comprising:
a) a light measuring device which performs a light measuring operation;
b) a movable mirror which moves between a mirror-down position and a mirror-up position;
c) an attitude detecting device which detects whether the camera is in a first attitude at which stabilization time of said movable mirror is shorter or in a second attitude at which stabilization time of said movable mirror is longer; and
d) a control circuit which gives to said light measuring device an instruction for starting the light measuring operation, after the stabilization time of said movable mirror has elapsed,
wherein, if an attitude of the camera is the first attitude at the time of start of a continuous photo-taking operation and the attitude of the camera has changed from the first attitude to the second attitude in process of the continuous photo-taking operation, said control circuit does not give to said light measuring device the instruction for starting the light measuring operation.

12. A camera according to claim 11, wherein said attitude detecting device detects a direction of gravity acting on the camera.

13. A camera according to claim 11, wherein said movable mirror is influenced by gravity when moving from the mirror-up position to the mirror-down position.

14. A camera according to claim 11, wherein, if the attitude of the camera is the first attitude at the time of start of the continuous photo-taking operation and the attitude of the camera has changed from the first attitude to the second attitude in process of the continuous photo-taking operation, said control circuit does not give to said light measuring device the instruction for starting the light measuring operation, until the attitude of the camera changes from the second attitude to the first attitude.

15. A camera comprising:
a) a focus detecting device which performs a focus detecting operation;
b) a movable mirror which moves between a mirror-down position and a mirror-up position;
c) an attitude detecting device which detects whether the camera is in a first attitude at which stabilization time of said movable mirror is shorter or in a second attitude at which stabilization time of said movable mirror is longer; and
d) a control circuit which gives to said focus detecting device an instruction for starting the focus detecting operation, after the stabilization time of said movable mirror has elapsed,
wherein, if an attitude of the camera is the first attitude at the time of start of a continuous photo-taking operation and the attitude of the camera has changed from the first attitude to the second attitude in process of the continuous photo-taking operation, said control circuit does not give to said focus detecting device the instruction for starting the focus detecting operation.

16. A camera according to claim 15, wherein said attitude detecting device detects a direction of gravity acting on the camera.

17. A camera according to claim 15, wherein said movable mirror is influenced by gravity when moving from the mirror-up position to the mirror-down position.

18. A camera according to claim 15, wherein, if the attitude of the camera is the first attitude at the time of start of the continuous photo-taking operation and the attitude of the camera has changed from the first attitude to the second attitude in process of the continuous photo-taking operation, said control circuit does not give to said focus detecting device the instruction for starting the focus detecting operation, until the attitude of the camera changes from the second attitude to the first attitude.

* * * * *

UNITED STATES PATENT AND TRADEMARK OFFICE
CERTIFICATE OF CORRECTION

PATENT NO.     : 6,226,458 B1  
DATED          : May 1, 2001  
INVENTOR(S)    : Shoji Kaihara Page 1 of 1

It is certified that error appears in the above-identified patent and that said Letters Patent is hereby corrected as shown below:

Column 6,  
Line 3, delete "24c" and insert -- 24d --.  
Line 5, delete "24c is located" and insert -- 24d is located --.  
Line 7, delete "24c are approximately" and insert -- 24d are approximately --.  
Line 59, delete "24c" and insert -- 24d --.

Column 7,  
Line 52, delete "24c" and insert -- 24d --.

Column 11,  
Line 29, delete "T1again" and insert -- T1 again --.

Signed and Sealed this

Twenty-first Day of May, 2002

Attest:

Attesting Officer

JAMES E. ROGAN  
Director of the United States Patent and Trademark Office